Feb. 14, 1967  B. T. VINCZE  3,304,499
ESCAPEMENT AND CONTACT MECHANISM HAVING SEPARATELY ACTING
SERIES CONTROLLERS FOR TESTING ELECTRONIC COMPONENTS
Filed Nov. 27, 1962  2 Sheets-Sheet 2
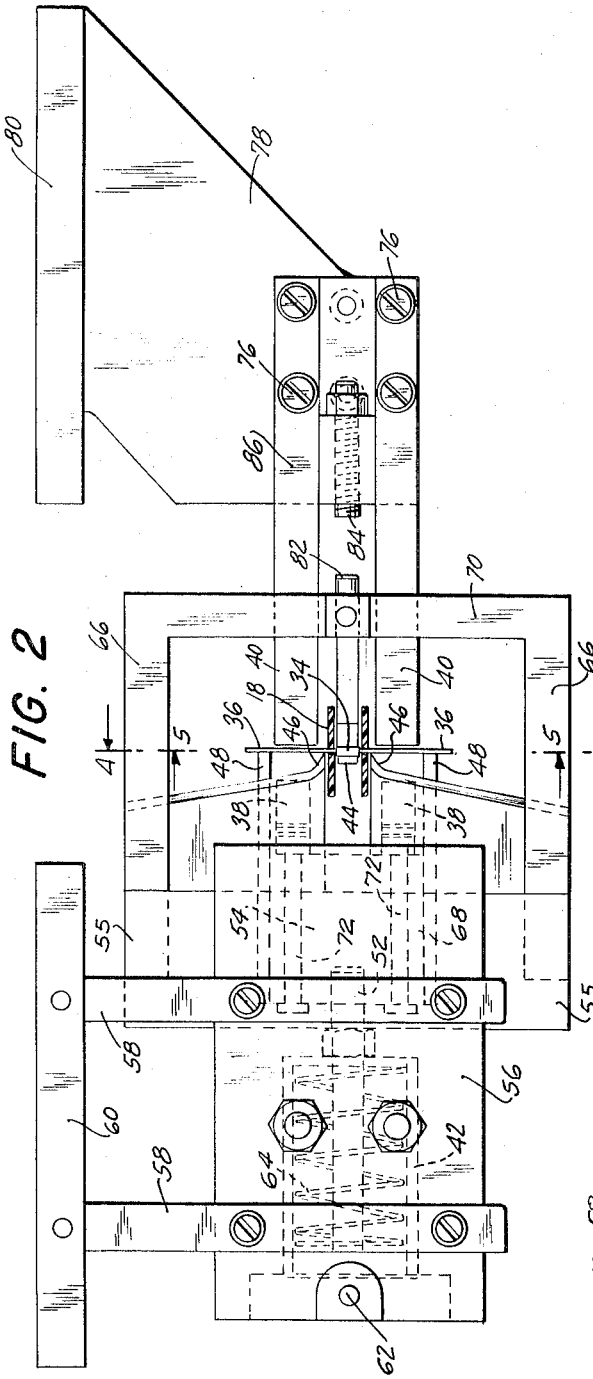
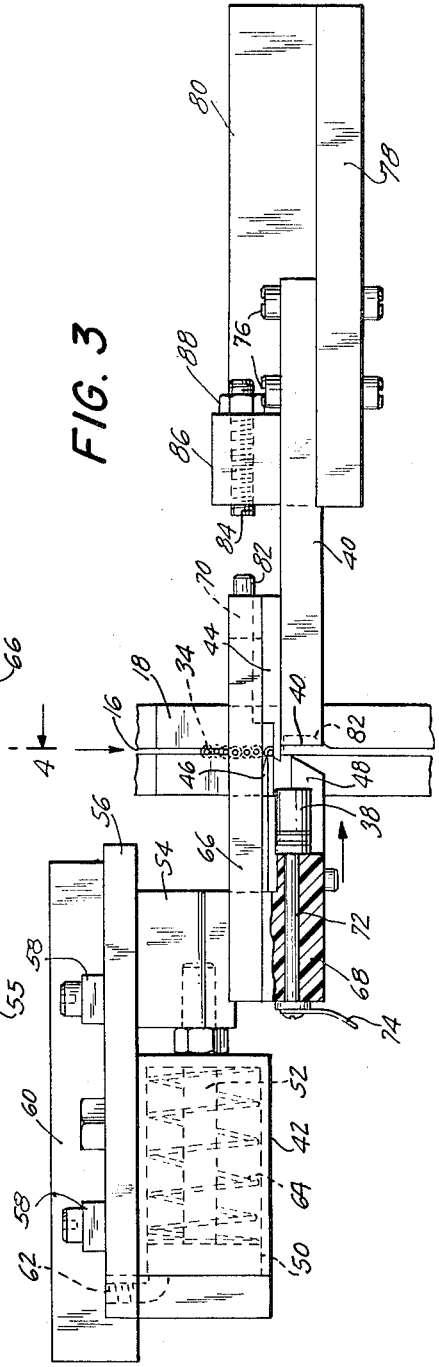
INVENTOR.
BELA T. VINCZE
BY James and Franklin
ATTORNEYS 3,304,499
ESCAPEMENT AND CONTACT MECHANISM HAVING SEPARATELY ACTING SERIES CONTROLLERS FOR TESTING ELECTRONIC COMPONENTS
Bela T. Vincze, South Bellingham, Mass., assignor to General Instrument Corporation, Newark, N.J., a corporation of New Jersey
Filed Nov. 27, 1962, Ser. No. 240,233
3 Claims. (Cl. 324—158)

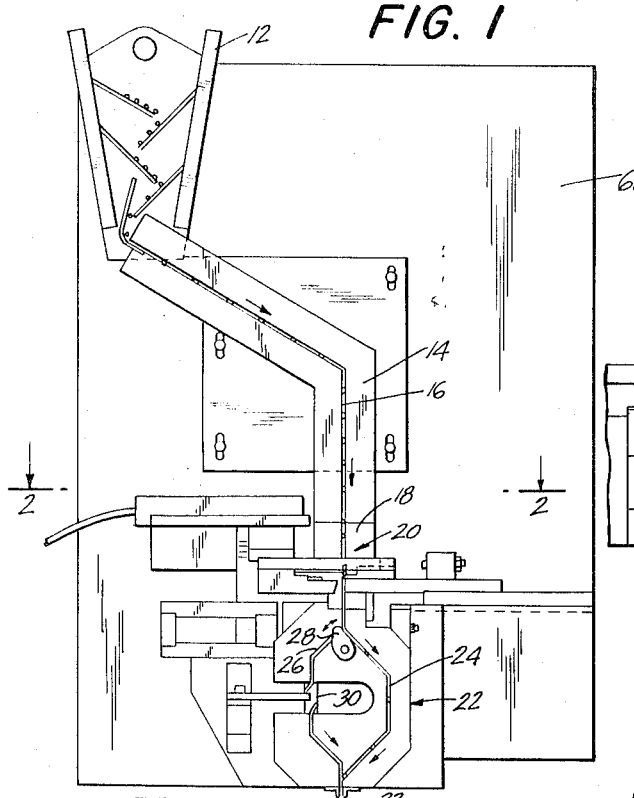
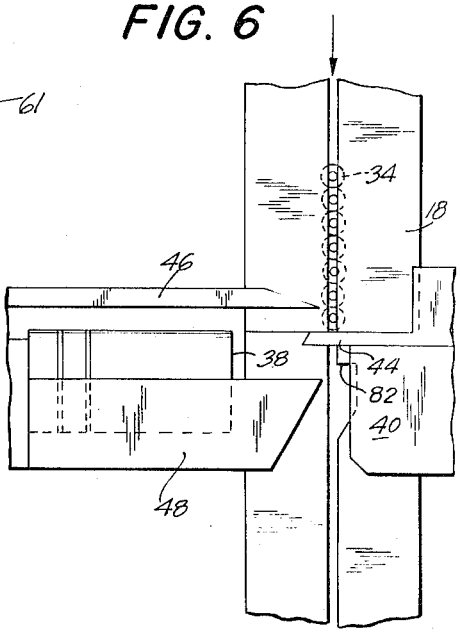
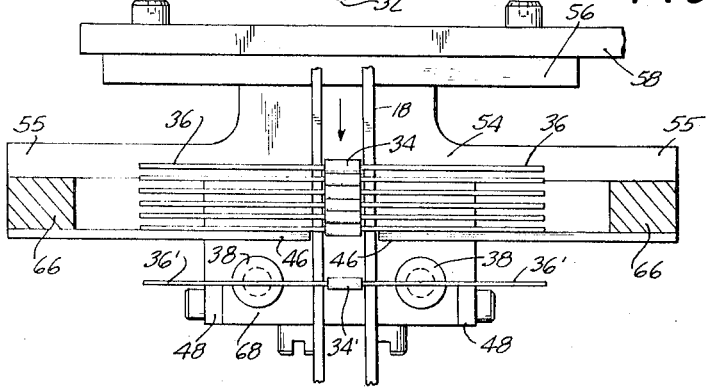
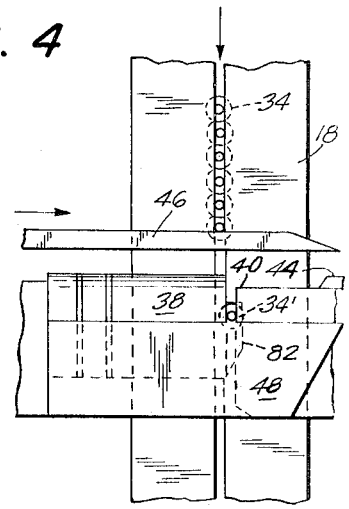
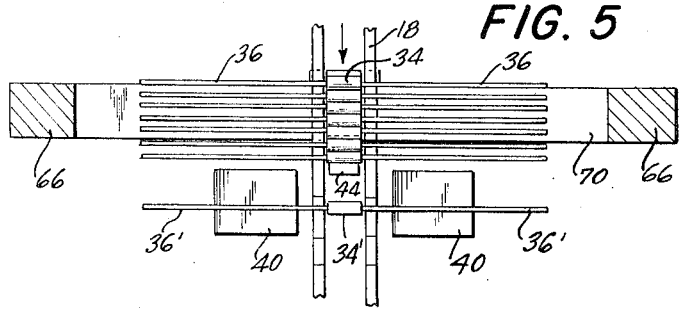

This invention relates to a combined escapement and contact mechanism for the testing of electronic components, and more particularly to the testing of such components which are fed down a chute.

The development of solid state electronics has led to the use of very small components. Glass diodes, for example, may have a diameter of say 1/10 inch and a length of 1/4 inch, with wire leads extending axially in opposite directions for a distance of say 1 1/4 inches on each side. Such components may be handled by hoppering them and feeding them down a chute.

Electrical contact with the leads is required for test purposes. One simple test may be for polarization, so that the diodes may all be oriented alike prior to marking the same by means of a printing unit. The devices also may be tested for certain operating characteristics, and for classification in different groups according to the test results. Heretofore in order to make electrical contact the electronic components had to be delivered from the chute to a testing machine or a test station outside the chute.

The primary object of the present invention is to improve the handling of such components while making electrical contact with the same for test purposes. A more specific object is to retain the components in a chute, and under full control, during the test. Considered in somewhat different aspect, a feature and object of the invention is to provide a chute with escapement mechanism to separate or release the components one at a time, combined with electrical contact mechanism which makes contact with the separated component, and which then releases the same for continued travel down the chute. In this way there is no loss of control over the components during the testing operation.

To accomplish the foregoing general objects, and other more specific objects which will hereinafter appear, my invention resides in the escapement and contact elements, and their relation one to another and to the chute, as are hereinafter more particularly described in the following specification. The specification is accompanied by drawings in which:

FIG. 1 is an elevation, drawn to small scale, and showing how the present contact mechanism may be employed in a chute leading to a polarizing mechanism;

FIG. 2 is a horizontal section, drawn to larger scale, and taken approximately in the plane of the line 2—2 of FIG. 1;

FIG. 3 is a partially sectioned elevation of the mechanism shown in FIG. 2;

FIG. 4 is a transverse section taken in the plane of the line 4—4 of FIG. 2, and looking in the direction of the arrows 4—4;

FIG. 5 is a transverse section taken in the same plane, but looking in opposite direction, as indicated by the arrows 5—5 in FIG. 2; and FIGS. 6 and 7 are fragmentary views explanatory of the operation of the escapement and contact mechanism.

Referring to the drawing, and more particularly to FIG. 1, the electronic components, in this case glass diodes, are preliminarily hoppered in a hopper 12 which may be of known character, and which aligns the components in horizontal parallel relationship. The components then move down and are stacked in a chute 14, which may be dimensioned to receive the glass body of the diode, and which is slotted on both sides, as shown at 16, to pass the lead wires of the components, which then project outwardly on each side of the chute. Inasmuch as the side slots 16 are continuous throughout the length of the chute, the chute in effect is structurally made of two half chutes spaced slightly apart. Most of chute 14 may be made of metal, but the portion 18 immediately at a contact or test station 20 is made of insulation material.

The hopper 12 does not polarize the diodes, and for marking and other purposes it is desirable that they be polarized alike. For this purpose the components are tested at the test station 20, which is followed by polarizing mechanism generally designated 22, beneath which may be mounted an appropriate printing machine (not shown) for marking the diodes. If desired a rotary magnetic chuck of the type shown in my copending application Ser. No. 233,329 filed October 26, 1962, now Patent No. 3,164,081 granted on January 5, 1965, may be used at the printing machine. It will be understood that diodes of one polarity move down the right hand track 24, while diodes of opposite polarity move down the left hand track 26, according to the position of a track switch 28, which in turn is controlled by the test mechanism. Diodes moving down the track 26 are reversed end for end by a helical path at 30, so that the diodes, when rejoined in the single track 32, have like polarity.

Although the test station 20 is here used to test for polarity, it will be understood that the escapement and contact mechanism next described may be used to test for classification and distribution of the components into different bins.

The mechanism at station 20 is shown in greater detail in FIGS. 2 and 3 of the drawing. These show the insulation portion 18 of the chute, and they also show the components 34 with outwardly projecting lead wires 36 which pass through the side slots 16 of the chute. There are horizontally movable electrical contacts 38 on opposite sides of the chute for contacting the lead wires 36 for test purposes. There is also a horizontally movable escapement mechanism around the chute for supporting the stack of components above the contacts, and for releasing one component at a time to the contacts.

Considered in greater detail, there are spaced stationary stops 40 at each side of the chute 18. The ends of these stops are offset slightly from the side slots of the chute. The horizontally movable contacts 38 are on the opposite edge of the chute, and serve to press the lead wires 36 against the stops 40. There is an actuator, in this case an air cylinder 42, to move the contacts horizontally.

A finger means 44 prevents downward movement of the components stacked above it in the chute. This finger means is in the chute and extends from the edge of the chute opposite the contacts 38. It is mechanically connected to the contacts for movement therewith. There are also separating blades 46, or so-called "knives", on opposite sides of the chute and located somewhat higher than the contacts. These knives are connected to the contacts for movement therewith, and they enter the clearance space between the leads of the bottom component and the leads of the next higher component. There are also test supports 48 which are spaced apart at the sides of the chute, and which are located at the level of the axis of the contacts.

The disposition of the parts is such that the superposed components higher than the bottom component are supported by the advancing knives 46 as the escapement mechanism moves to the right, and as the bottom component is released by retraction of the finger means 44 which also moves to the right. The released component moves down to and is supported by the test supports 48 which support it in position for test, that is, in position for the electrical contacts 38 to bear against the leads, the latter being stopped by the stops 40 against the force of the contacts 38.

When the escapement mechanism is moved to the left, the tested component is released for continued movement down the chute. The retraction of the knives 46 is accompanied by an advance of the finger means 44 into the chute, which again holds the stack of components.

Considering the arrangement in greater detail, air cylinder 42 has a piston 50 and a piston rod 52 which is connected to a crosshead 54. This is slidable beneath a mounting plate 56 which is secured by arms 58 and a plate 60 to a side frame plate of the apparatus (shown at 61 in FIG. 1). Air is supplied to the cylinder 42 (FIG. 2) through a connection at 62. The cylinder here shown is single acting, its return movement being provided by a spring 64.

Crosshead 54 carries a rectangular frame having side arms 66, and a cross bar 70. The cross bar 70 carries the finger 44 which projects into the chute and which serves to support the stack of components. The outwardly extending arms of crosshead 54 carry the side arms 66, which in turn carry the cross bar 70. The mid portion of crosshead 54 also carries an insulation block 68 for the electrical contacts 38, the shanks 72 of which pass through the insulation, and receive flexible conductors 74 which extend to the test circuitry. The test supports 48 are also secured to and carried by the block 68.

The stops 40 are stationary and accordingly are fixedly mounted at 76 on a bracket 78 having an upright flange 80 which is secured to the vertical wall 61 (FIG. 1) of the apparatus.

If desired, the travel of the escapement mechanism may be limited by means of a motion stop 82 (FIGS. 2 and 3) which bears against a stop screw 84. The latter is threaded in a block 86 on the bracket 78, and the adjustment of stop screw 84 may be locked by means of a lock nut 88. Such motion stop mechanism may be desired in order to limit the force exerted by the contacts on the lead wires and on the stops 40.

It will be understood that the stops 40 may be made of insulation, or may be made of metal which is insulatedly mounted, in order not to short circuit the leads of the component. Similarly the test supports 48 may be made of insulation material, or may be made of metal and insulatedly mounted on the block 68 which preferably is made of insulation material.

The parts so far described are also shown in FIGS. 4 and 5, which show the insulation portion 18 of the chute, the components 34 with their oppositely extending leads 36, the knives 46 which support the leads and consequently the stack when the knives are advanced, the component 34' which is being tested, and the leads 36' of component 34' which leads are resting on the spaced test supports 48. These hold the leads in alignment with the electrical contacts 38. The supports 48 and contacts 38 are carried by insulation block 68, which in turn is carried beneath the cross head 54. The sides 66 of the frame are also shown, these being carried by the outwardly extending wings 55 of the crosshead 54. The knives 46 are carried by the sides 66 in front of the crosshead 54.

Referring now to FIG. 5, which is a section through the chute like FIG. 4, but looking in opposite direction, the insulation portion 18 of the chute carries components 34 with oppositely extending lead wires 36. The finger 44, when advanced, supports the stack of components. The released component 34' would be resting on the test supports shown at 48 in FIG. 4, and is therefore in alignment with the fixed stops 40 (FIG. 5) which support the leads 36' against the motion of the contacts.

The operation of the escapement and contact mechanism may be further explained with reference to FIGS. 6 and 7. FIG. 6 shows contacts 38, knives 46 and supports 48 retracted, while the finger 44 is advanced and is serving to support the stack of components 34. In FIG. 7 the finger 44 has been retracted, thereby permitting the lowermost component 34' to fall onto the test supports 48, which meanwhile have advanced. The knives 46 also have advanced and are supporting the stack of diodes. The contacts 38 have advanced behind the knives 46 and supports 48, and are pressing the leads of component 34' against the stationary stops 40.

It will be understood that the fixed parts 40 may be the electrical contacts which are made of metal, and the movable parts 38 may provide pressure, without changing the operation of the combined escapement and contact mechanism. The present arrangement has the advantage of avoiding accidental contact. In the terminology here employed the finger 44 retracts as the remaining elements of the escapement advance, and viceversa, even though all are structurally connected together and move in unison.

The sides of the insulation portion of the chute 18 may be recessed or cut away slightly at the test station, as shown at 82, to insure good contact without bending the wire leads, it being kept in mind that the fixed stops 40 preferably are offset somewhat from the chute path in order to make certain that they do not interfere with descent of the components through the chute.

It is believed that the construction and operation of my improved combined escapement and contact mechanism, as well as the advantages thereof, will be apparent from the foregoing detailed description. A main advantage is that the components in a chute may be tested without removing the components from the chute. There is no loss of control of the components. The device will operate at high speed, but does not require a uniform time cycle. The release of a tested component may itself trigger the cycle, and each cycle may be contingent on completion of a preceding cycle, so that the timing may be irregular. If the particular test being performed requires a long test time, that too may be provided.

Although the actuator shown is operated by air, it will be understood that any suitable actuator may be employed, such as a solenoid. The finger means 44 disposed inside the chute may be replaced by spaced fingers straddling the chute. Conversely, the spaced knives 46 straddling the chute may be replaced by a single knife which moves into the chute, in which case the knife will move beneath a component body instead of beneath lead wires. The stationary parts 40 might have wire connections, instead of the movable parts 38, for use as contacts.

It will therefore be understood that while I have shown and described the invention in a preferred form, changes may be made without departing from the scope of the invention, as sought to be defined in the following claims. In the claims the reference to the contacts being movable is not intended to exclude a reversal of connections whereby the stationary stops act as the contacts. The reference to finger means is not intended to differentiate as between the use of a single finger or spaced fingers. Similarly, the reference to knife means is not intended to differentiate between the use of spaced knives or a single knife.

I claim:

1. Contact mechanism for testing electronic components having oppositely extending lead wires, said mechanism comprising an upright chute having edges and having sides with narrow side slots for the lead wires of the components, stationary stops at the sides of the chute extending away from one edge of the chute, movable contacts at the sides of the chute extending away from the opposite edge of the chute and movable horizontally toward the stops for pressing the lead wires of the component against said stops and thereby electrically contacting the lead wires, a finger to prevent downward movement of the components, said finger extending in a direction away from the contacts and away from the same edge of the chute as the stops, knives at the sides of the chute somewhat higher than the contacts and extending away from the same edge of the chute as the contacts and fixedly connected to the contacts for movement therewith to enter the clearance space between the leads of the bottom component and the next higher component, test supports at the sides of the chute extending away from the same edge of the chute as the contacts and fixedly connected to the contacts for movement therewith, said supports being located at the level of the contacts, a rigid frame connecting the contacts and knives and tests supports at one edge of the chute to the finger at the opposite edge of the chute for simultaneous horizontal movement of all of said parts, the frame elements at the sides of the chute being spaced apart further than the overall length of the components including the lead wires, and a linear actuator to reciprocate the frame together with the contacts, knives, test supports and finger, the disposition of the parts being such that the superposed components higher than the bottom component are supported by the advancing knives as the bottom component is released by retraction of the finger, and the bottom component is supported by the tests supports as it is being contacted for tests, and the tested component is released for continued movement down the chute when the supports and knives are retracted, at which time the finger advances to again hold the stack of components.

2. Contact mechanism for testing electronic components having oppositely extending lead wires, said mechanism comprising an upright chute having edges and having sides with narrow side slots for the lead wires of the components, stationary stops at the sides of the chute extending away from one edge of the chute, movable contacts at the sides of the chute extending away from the opposite edge of the chute and movable horizontally toward the stops for pressing the lead wires of the component against said stops and thereby electrically contacting the lead wires, a finger having its forward end in said chute beneath the superposed components to prevent downward movement of the components, said finger extending in a direction away from the contacts and away from the same edge of the chute as the stops, knives at the sides of the chute somewhat higher than the contacts and extending away from the same edge of the chute as the contacts and fixedly connected to the contacts for movement therewith to enter the clearance space between the leads of the bottom component and the next higher component, test supports at the sides of the chute extending away from the same edge of the chute as the contacts and fixedly connected to the contacts for movement therewith, said supports being located at the level of the contacts and being laterally offset from the fixed stops, a rigid frame connecting the contacts and knives and test supports at one edge of the chute to the finger at the opposite edge of the chute for simultaneous horizontal movement of all of said parts, the frame elements at the sides of the chute being spaced apart further than the overall length of the components including the lead wires, and a linear actuator to reciprocate the frame together with the contacts, knives, test supports and finger, the disposition of the parts being such that the superposed components higher than the bottom component are supported by the advancing knives as the bottom component is released by retraction of the finger, and the bottom component is supported by the test supports as it is being contacted for test, and the tested component is released for continued movement down the chute when the supports and knives are retracted, at which time the finger advances to again hold the stack of components.

3. Contact mechanism for testing electronic components having oppositely extending lead wires, said mechanism comprising an upright chute having edges and having sides with narrow side slots for the lead wires of the components, stationary stops at the sides of the chute extending away from one edge of the chute and offset somewhat from the aforesaid chute slots, movable contacts at the sides of the chute extending away from the opposite edge of the chute and movable horizontally toward the stops for pressing the lead wires of the component against said stops and thereby electrically contacting the lead wires, a finger having its forward end in said chute beneath the superposed components to prevent downward movement of the components, said finger extending in a direction away from the contacts and away from the same edge of the chute as the stops, knives at the sides of the chute somewhat higher than the contacts and extending away from the same edge of the chute as the contacts and fixedly connected to the contacts for movement therewith to enter the clearance space between the leads of the bottom component and the next higher component, test supports at the sides of the chute extending away from the same edge of the chute as the contacts and fixedly connected to the contacts for movement therewith, said supports being located at the level of the contacts and being laterally offset from the fixed stops, the side slots of the chute being cut away slightly at the height of the contacts to afford a slight horizontal movement of a component to the stops when being contacted for test purposes, a rigid frame connecting the contacts and knives and test supports at one edge of the chute to the finger at the opposite edge of the chute for simultaneous horizontal movement of all of said parts, the frame elements at the sides of the chute being spaced apart further than the overall length of the components including the lead wires, and a linear actuator to reciprocate the frame together with the contacts, knives, test supports and finger, the disposition of the parts being such that the superposed components higher than the bottom component are supported by the advancing knives as the bottom component is released by retraction of the finger, and the bottom component is supported by the test supports as it is being contacted for test, and the tested component is released for continued movement down the chute when the supports and knives are retracted, at which time the finger advances to again hold the stack of components.

References Cited by the Examiner

UNITED STATES PATENTS

| | | | |
|---|---|---|---|
| 2,896,379 | 7/1959 | Hermann | 221—298 X |
| 2,975,878 | 3/1961 | Cason | 324—158 X |
| 2,992,730 | 7/1961 | Rayburn | 209—81 |
| 3,032,191 | 5/1962 | Clukey | 324—158 X |
| 3,073,446 | 1/1963 | Wilson et al. | 324—158 X |

WALTER L. CARLSON, *Primary Examiner.*

E. L. STOLARUN, *Assistant Examiner.*